(12) United States Patent
Colbert et al.

(10) Patent No.: US 8,660,254 B2
(45) Date of Patent: Feb. 25, 2014

(54) SYSTEM AND METHOD FOR CALL MANAGEMENT

(75) Inventors: Michael Colbert, Sherman Oaks, CA (US); Michael Gray, Sherman Oaks, CA (US); Peter Baccay, Redwood City, CA (US)

(73) Assignee: BlackBerry Limited, Waterloo (CA)

( * ) Notice: Subject to any disclaimer, the term of this patent is extended or adjusted under 35 U.S.C. 154(b) by 1182 days.

(21) Appl. No.: 12/394,625

(22) Filed: Feb. 27, 2009

(65) Prior Publication Data

US 2010/0220849 A1 Sep. 2, 2010

(51) Int. Cl.
*H04M 3/42* (2006.01)
*H04M 11/04* (2006.01)

(52) U.S. Cl.
USPC .......... 379/208.01; 379/48; 379/201.01; 379/211.01; 379/215.01; 379/218.01

(58) Field of Classification Search
USPC ........ 379/208.01, 211.01, 215.01, 48, 218.02
See application file for complete search history.

(56) References Cited

U.S. PATENT DOCUMENTS

| | | | |
|---|---|---|---|
| 5,999,613 A * | 12/1999 | Nabkel et al. | 379/215.01 |
| 6,041,048 A | 3/2000 | Erickson et al. | |
| 6,310,946 B1 * | 10/2001 | Bauer et al. | 379/208.01 |
| 6,870,917 B2 | 3/2005 | Chen et al. | |
| 7,133,515 B1 | 11/2006 | Cook | |
| 7,693,509 B2 | 4/2010 | Miyata | |
| 2002/0095498 A1 | 7/2002 | Chanda et al. | |
| 2002/0111167 A1 | 8/2002 | Nguyen et al. | |
| 2002/0122401 A1 | 9/2002 | Xiang et al. | |
| 2004/0092252 A1 | 5/2004 | Gustavsson et al. | |
| 2004/0156380 A1 | 8/2004 | Silverman et al. | |
| 2007/0040700 A1 * | 2/2007 | Bachelder | 340/902 |
| 2007/0217437 A1 * | 9/2007 | Forte | 370/401 |
| 2008/0037753 A1 * | 2/2008 | Hofmann | 379/208.01 |
| 2008/0130554 A1 | 6/2008 | Gisby et al. | |
| 2008/0235380 A1 | 9/2008 | Maes | |
| 2009/0061832 A1 | 3/2009 | Goggans et al. | |

FOREIGN PATENT DOCUMENTS

| | | |
|---|---|---|
| EP | 1560456 B1 | 1/2005 |
| JP | 61212950 | 9/1986 |
| WO | 2008/008242 A2 | 1/2008 |

OTHER PUBLICATIONS

M. Hakaste, E. Nikula, S. Hamiti, "GSM/EDGE Standards Evolution (up to Rel'4)" GSM, GPRS and EDGE Performance: Evolution towards 3G/UMTS, Second Edition, 2003 John Wiley & Sons, Ltd., ISBN: 0-470-86694-2.
A. Johnston et al., "SIP Service Examples" Internet Engineering Task Force (IETF), Internet Draft, Mar. 2001.
English Language Abstract of JP 61212950; published Sep. 20, 1986.

* cited by examiner

*Primary Examiner* — Khai N Nguyen
(74) *Attorney, Agent, or Firm* — Novak Druce Connolly Bove + Quigg LLP

(57) ABSTRACT

A method and system for call management is provided. In a system embodiment a call manager server is provided that can managing incoming call requests from certain telephony devices and effect connections to other telephony devices based on those incoming call requests. The call manager server can also maintain a policy that defines permissions as to whether certain telephony devices can request interruption of an ongoing phone call at a destination telephony device.

12 Claims, 16 Drawing Sheets

SYSTEM AND METHOD FOR CALL MANAGEMENT

FIELD

The present specification relates generally to telecommunication and more specifically relates to a system and method for call management.

BACKGROUND

Telecommunication advances are permitting richer communication experiences, including telephony experiences. A known telephony features is Multi-level Precedence and Preemption (MLPP). MLPP is a specification used for military Department of Defence (DOD) networks and is required by DOD. The specification is defined according to the Integrated Services Digital Network (ISDN) under a Defence Switched Network (DSN) specification which uses information element 619. With MLPP, one can declare an emergency at different levels. It allows preemption of people using certain resources or people. For example, if a general wants to connect to a lieutenant, and the lieutenant is already on the phone, the general can barge in and preempt the lieutenant's ongoing call. The lieutenant hears a tone then the general is connected. As another example, a politician can invoke an MLPP override to get to an emergency team head during a disaster. In general, MLPP allows high priority people to get the resources they need.

MLPP has not been more broadly implemented in the traditional public switched telephone network (PSTN) due to the potential for abuse through irresponsible or malicious actions. An example of a variation of MLPP is disclosed in EP 1560456B1, which discloses a mobile switching center that performs a barge-in that allows a first user to communicate with a second user of a mobile communication device that is engaged in a preexisting active call. However, EP 1560456B1 still leaves certain potential for irresponsible or malicious actions. The application of MLPP in a private branch exchange ("PBX") is prone to similar abuses.

DETAILED DESCRIPTION OF THE EMBODIMENTS

Figure 1:
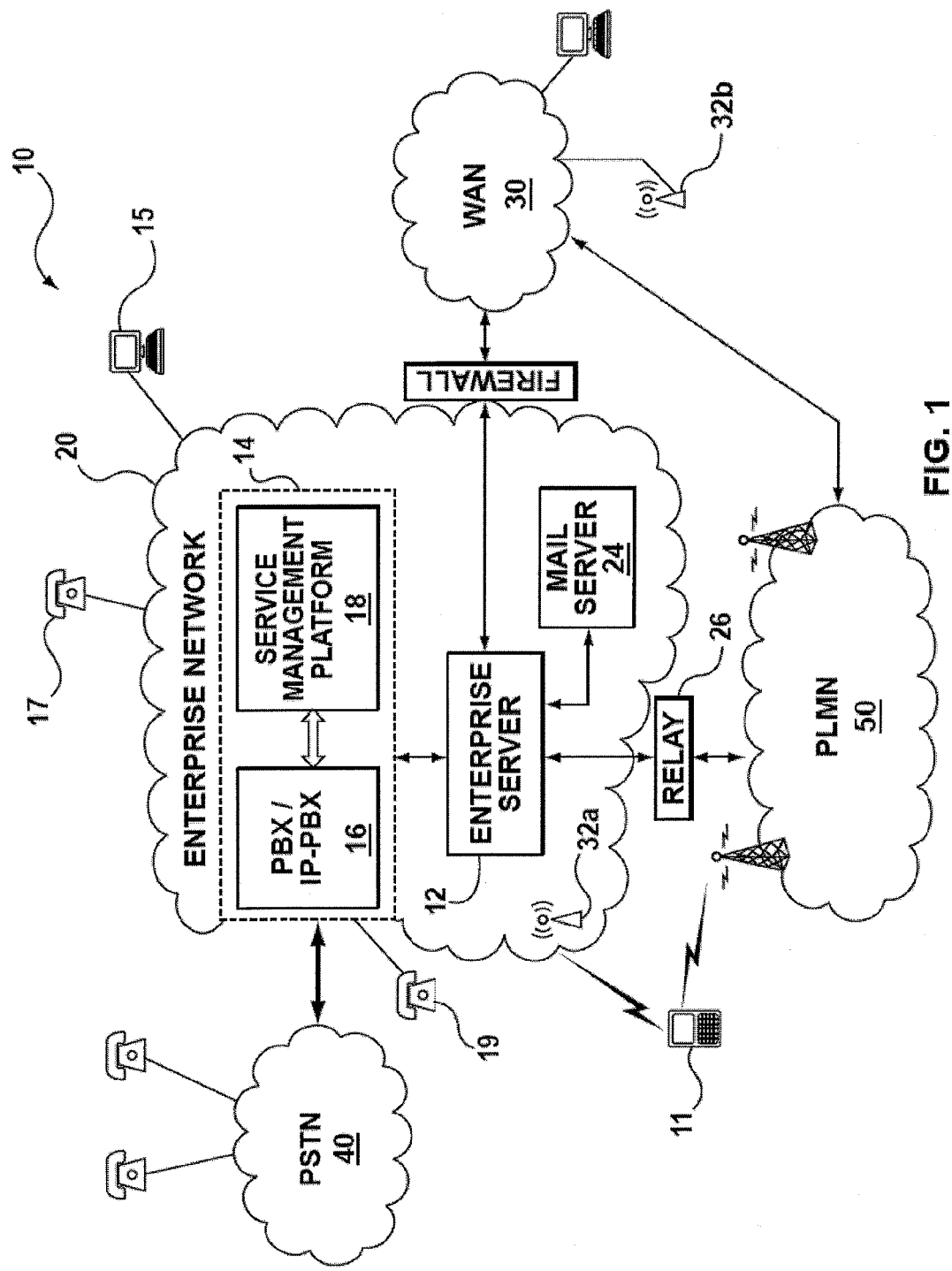
FIG. 1 shows, in block diagram form, an example system for managing enterprise-related mobile calls, including an enterprise communications platform.

The present specification provides a method of managing calls comprising:

receiving an incoming call at a call manager server a request to connect a first telephony device to a second telephony device;

if the second telephony device is otherwise engaged in another call with a third telephony device, determining at said call manager server if a preemption request exists to interrupt the another call;

if the preemption request exists, determining at said call manager server if a preemption policy permits the preemption request;

if the preemption policy permits the preemption request, then, at said call manager server terminating the another call and completing the call request by connecting the first telephony device to the second telephony device; and, if the preemption policy does not permit the preemption request, then at said call manager server, invoking a process for managing incoming call requests when the second telephony device is unavailable;

if the second telephony device is not otherwise engaged in another call with a third telephony device, then at said call manager server, completing the call request by connecting the first telephony device to the second telephony device.

The method can further comprise, if the preemption request does not exist, invoking the process for managing incoming call requests when the second telephony device is unavailable the call.

The first telephony device and the second telephony device can be associated with a private network and the preemption policy applies to the first telephony device and the second telephony device but does not apply to the third telephony device. The third telephony device can be associated with a public network. The policy can include preemption permissions associated with a plurality of additional telephony devices associated with the private network.

The policy can include permissions respective to the first telephony device and the second telephony device. The policy can permit preemption requests from the first telephony device to the second telephony device, but not permit preemption requests from the second telephony device to the first telephony device.

The policy can be based on the priority of the call request. The priority can include an indication if the call request is associated with an emergency. The policy cab include overrides such that either the first telephony device or the second telephony device will always accept a preemption request, or that the first telephony device or the second telephony device will never accept a preemption request.

Another aspect of the specification provides a call manager server comprising storage for maintaining a policy application and a policy database. The policy database includes a policy indicating permissions as to whether a first telephony device is permitted to interrupt an existing call of and a second telephony. The call manager further comprises a processor connected to the storage and configured to execute the policy application. The call manager server further comprises a network interface connected to the processor and configured to connect to the telephony devices. The processor is configured to receive a call request from the first telephony device to connect to the second telephony device. The processor is configured through the policy application to interrupt any existing call between the second telephony device if the policy data based indicates a permission that such interruption is permitted.

The call manager server can be configured so that the policy indicates whether said first telephony device and said second telephony device are permitted to interrupt an existing call with each other.

Embodiments of the present specification are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch exchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
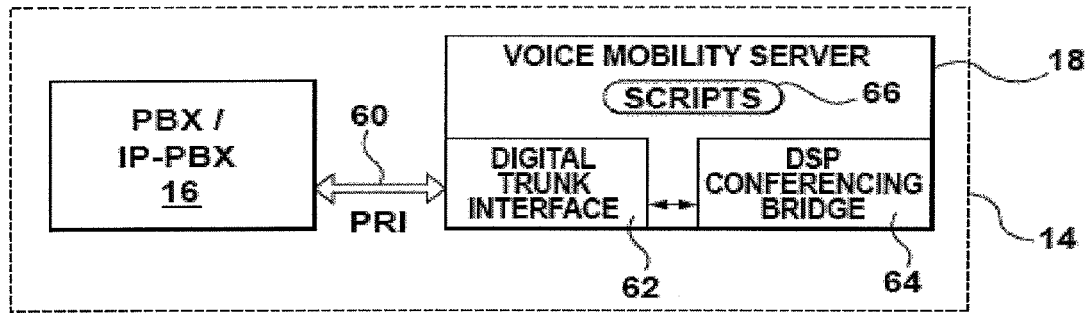
FIG. 2 shows, in block diagram form, further details of an embodiment of the enterprise communications platform.
Figure 3:
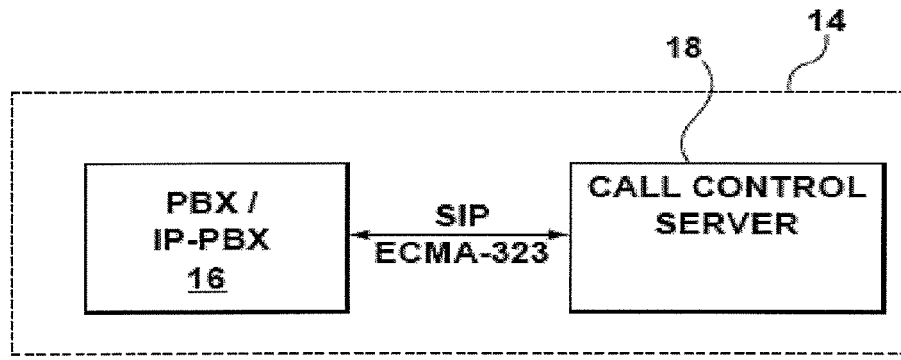
FIG. 3 shows another embodiment of the enterprise communications platform.
Figure 4:
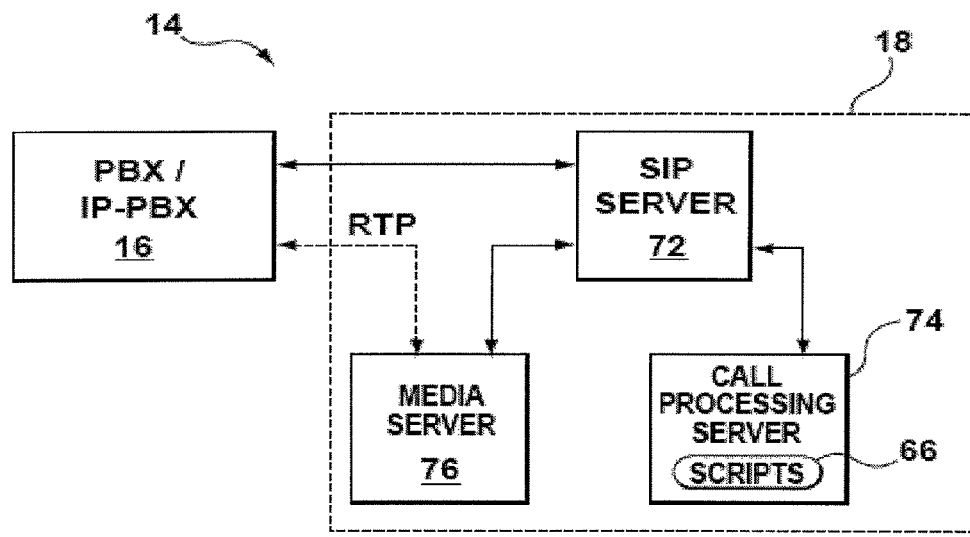
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
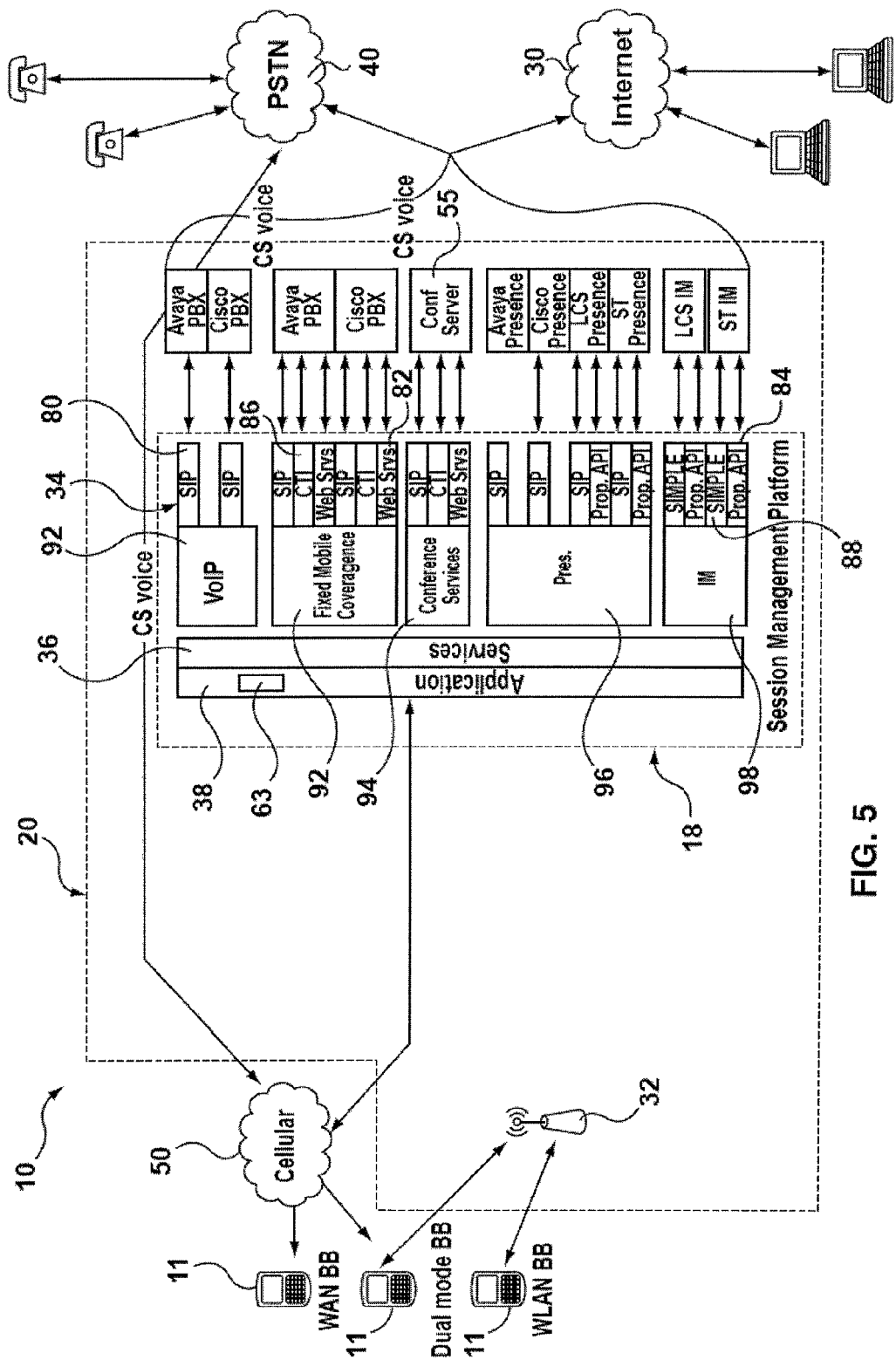
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Turning now to FIGS. 6A through 7B, the general operation of the system 10 using SIP 80 as the signaling protocol will be discussed, although it is recognized that the present system is not limited to the processes discussed herein. The signaling descriptions that follow are based on Third Party Call Control architecture, such as that illustrated in FIG. 3 or 5. It will be appreciated that similar but slightly modified signaling may be used in a First Party Call Control architecture, wherein the PBX 16 will pass media through to the SMP 18 for direct media handling by the SMP 18. Variations in the signaling to adapt to various architectures will be appreciated by those ordinarily skilled in the art.

Figure 6A:
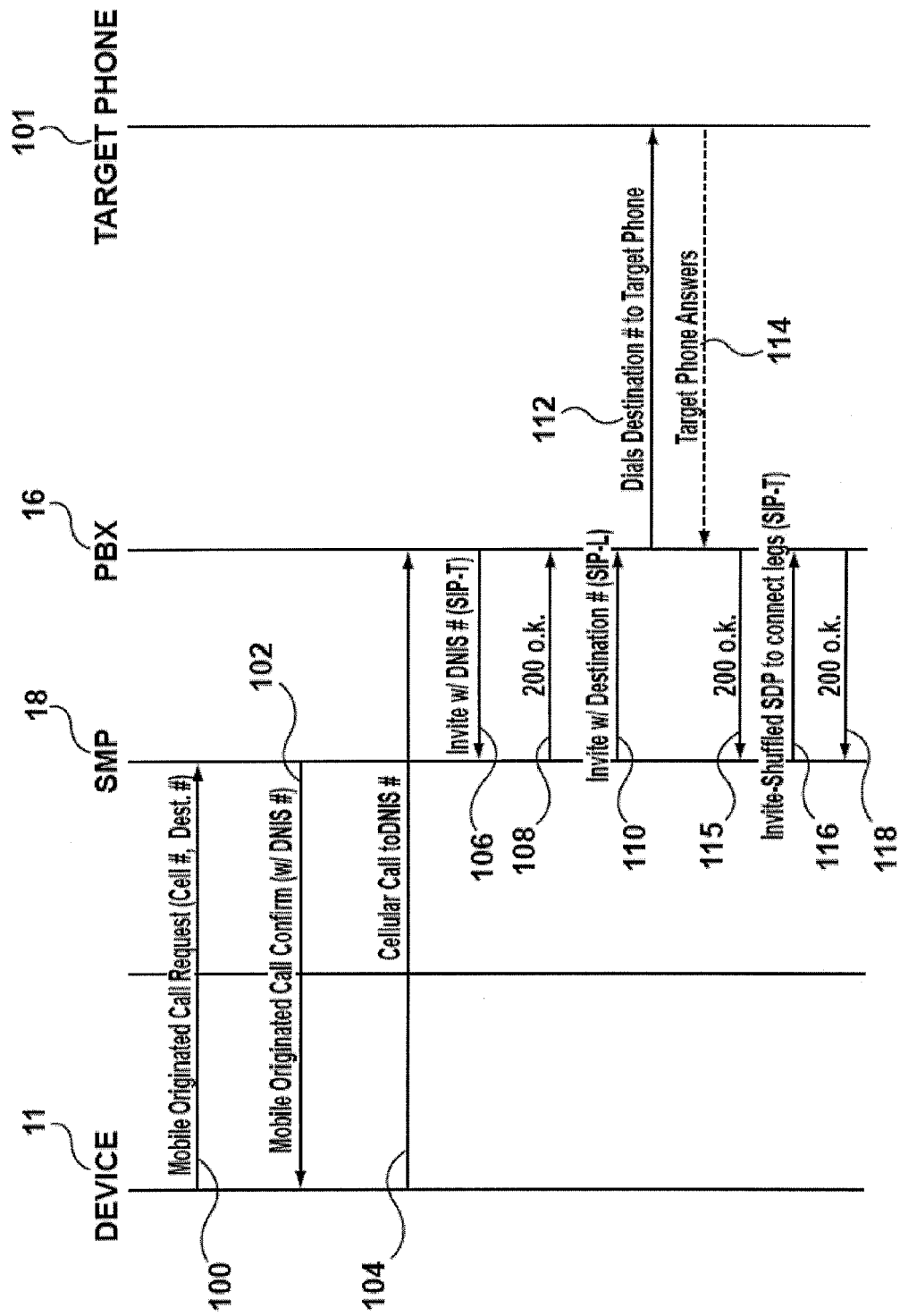
FIG. 6A is a signaling diagram generally indicating how mobile-originated, mobile-initiated calls are processed by the network of FIG. 5.

FIG. 6A provides a signaling diagram for a call originating from one of the mobile devices 11 to a target phone 101 connected to a Private Branch Exchange Server or PBX 16 provided within the enterprise network 20. First, the device 11 sends a mobile originated call request with its cellular number and the destination number of the target phone 101 to the SMP 18 (block 100). In some embodiments, the mobile originated call request may be sent via the WLAN through the enterprise server 12. In another embodiment, the call request may be sent via the PLMN/PSTN through the PBX 16, for example as an SMS message or using another messaging operation. The SMP 18 confirms the call request by sending the DNIS number to the device 11 (block 102). Next, the device 11 makes a cellular call using the DNIS number, which is received by the PBX 16 (block 104). As the DNIS has been configured in the PBX 16 to be routed to the SMP 18 via SIP-T, in response to the incoming call, the PBX 16 sends an invite over SIP-T with the DNIS number to the SMP 18 (block 106). The SMP 18 matches the incoming call with the expected call from the mobile, and if correct, acknowledges the invite by sending a 200 OK signal to the PBX 16, indicating that the mobile call leg is established (block 108).

The SMP 18 then sets up the outgoing call leg to the destination. It does this by sending an invite over SIP-L to the PBX 16 with the destination number of the target phone (block 110). SIP-L is used so that the call can be correctly attributed to the individual within the organization within any call records that are being maintained by the PBX 16. When the invite is received, the PBX 16 dials the destination number to the target phone 101 (block 112), and the target phone 101 answers the call (block 114). When the target phone 101 is answered, the PBX 16 sends a 200 OK signal to the SMP 18 indicating that the target phone 101 is ready to receive data (block 115). The SMP 18 then sends an invite over SIP-T to the PBX 16 and shuffles the SDP (Session Description Protocol, as known to those of ordinary skill in the art) to connect the call legs (block 116). When the call legs are connected, the PBX 16 sends a second 200 OK signal to the SMP 18 (block 118), and the users of the device 11 and target phone 101 can communicate with each other.

Note that between the cellular call leg being established and the outgoing call leg being answered, the mobile user hears ringing tones. These ringing tones may be provided by the PBX 16 using the presentation of early media from the outgoing call leg, or they may be generated locally on the device 11 if early media is not available. In the latter case, it will be necessary to localize the ringing tone to match the tone normally heard with a call through the PBX 16.

Figure 6B:
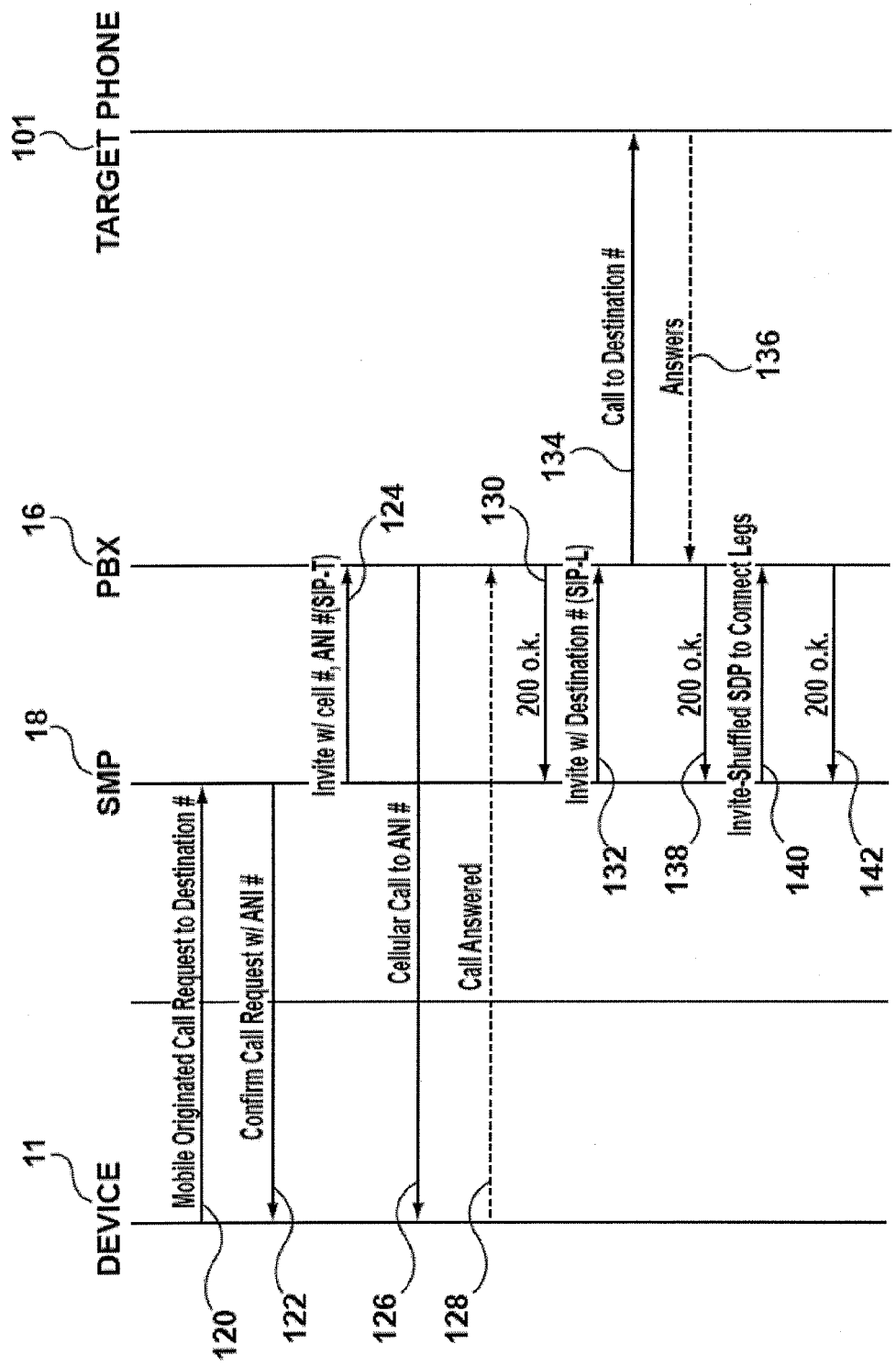
FIG. 6B is a signaling diagram generally indicating how mobile-originated, PBX-initiated, calls are processed by the network of FIG. 5.

The above description is known as a "mobile initiated" call, because the SMP 18 provides the mobile device 11 with the DNIS number into which the mobile device 11 has called. Alternatively, the mobile originated call could be "PBX initiated", as shown in FIG. 6B. Specifically, in a PBX-initiated call, upon receipt of the mobile originated call request (block 120), the SMP 18 confirms receipt of the call to the mobile device 11 with an ANI number (block 122), which the mobile device uses to identify the incoming call from the PBX 16. The PBX 16 then sends an invite over SIP-T to the PBX 16 with the cellular number of the device and the ANI number that is attached to the outgoing call (block 124). Upon receipt of the invite, the PBX 16 makes a cellular call to the device 11 (block 126), which is answered by the device (block 128). The device 11 checks the ANI number in the incoming call to confirm if the number is actually from the PBX 16. If the ANI number is stripped for any particular reason, then the device 11 may be configured to answer the call as a regular cellular call, or it may reject the call as unknown. When the device 11 answers the PBX-initiated call, the PBX 16 sends a 200 OK signal to the SMP 18, indicating that the call leg to the device is established (block 130).

In response, the SMP 18 sends an invite over SIP-L with the destination number of the target phone 101 to the PBX 16 (block 132). When the invite is received at the PBX 16, the PBX dials the destination number to the target phone 101 (block 134), the target phone 101 picks up the call (block 136), and a 200 OK signal is sent from the PBX 16 to the SMP 18 (block 138), indicating that the target phone 101 is also ready to receive data. In response to the 200 OK, the SMP 18 sends an invite to the PBX 16, shuffling the SDP to connect the call legs (block 140). Finally, when the call legs are connected, the PBX 16 sends a second 200 OK signal to the SMP 18, and the users of the device 11 and target phone 101 are able to communicate with each other.

In both instances, the SMP 18 is performing third party call control of the two call legs, the PBX 16 remaining in control of the call. The decision of whether to proceed with a mobile-initiated call or a PBX-initiated call can be set by policy. Specifically, the option to select either mobile-initiated or PBX-initiated calls is a feature provided in the SMP 18, and an administrator for the enterprise network 20 can determine which setting to use. For example, in some cases it may be more cost effective for the corporation to utilize PBX-initiated calls rather than mobile-initiated calls, and vice versa. However, it is appreciated that the system 10 is not limited to the above processes.

Figure 7A:
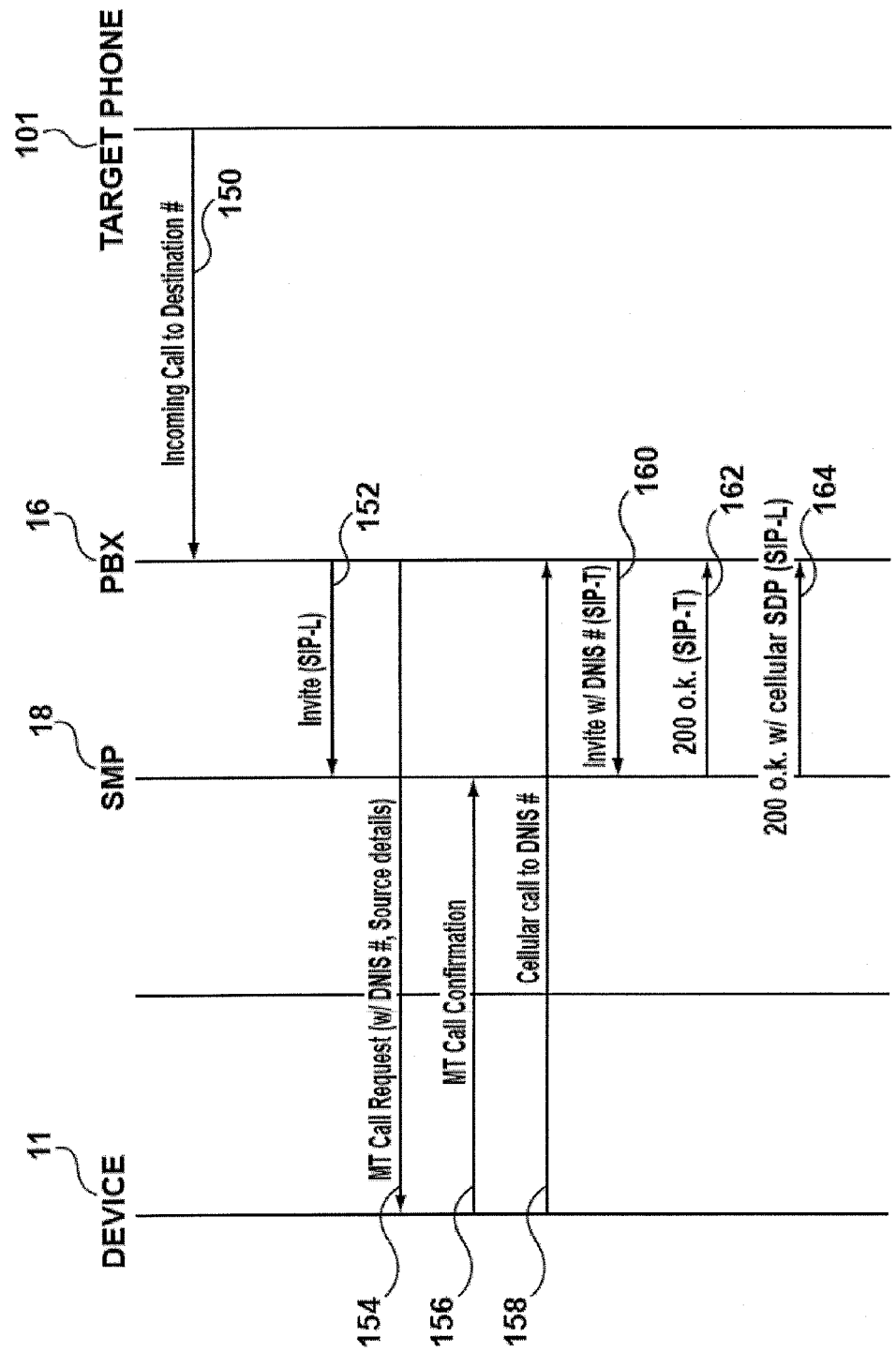
FIG. 7A is a signaling diagram generally indicating how mobile-terminated, mobile-initiated calls are processed by the network of FIG. 5.
Figure 7B:
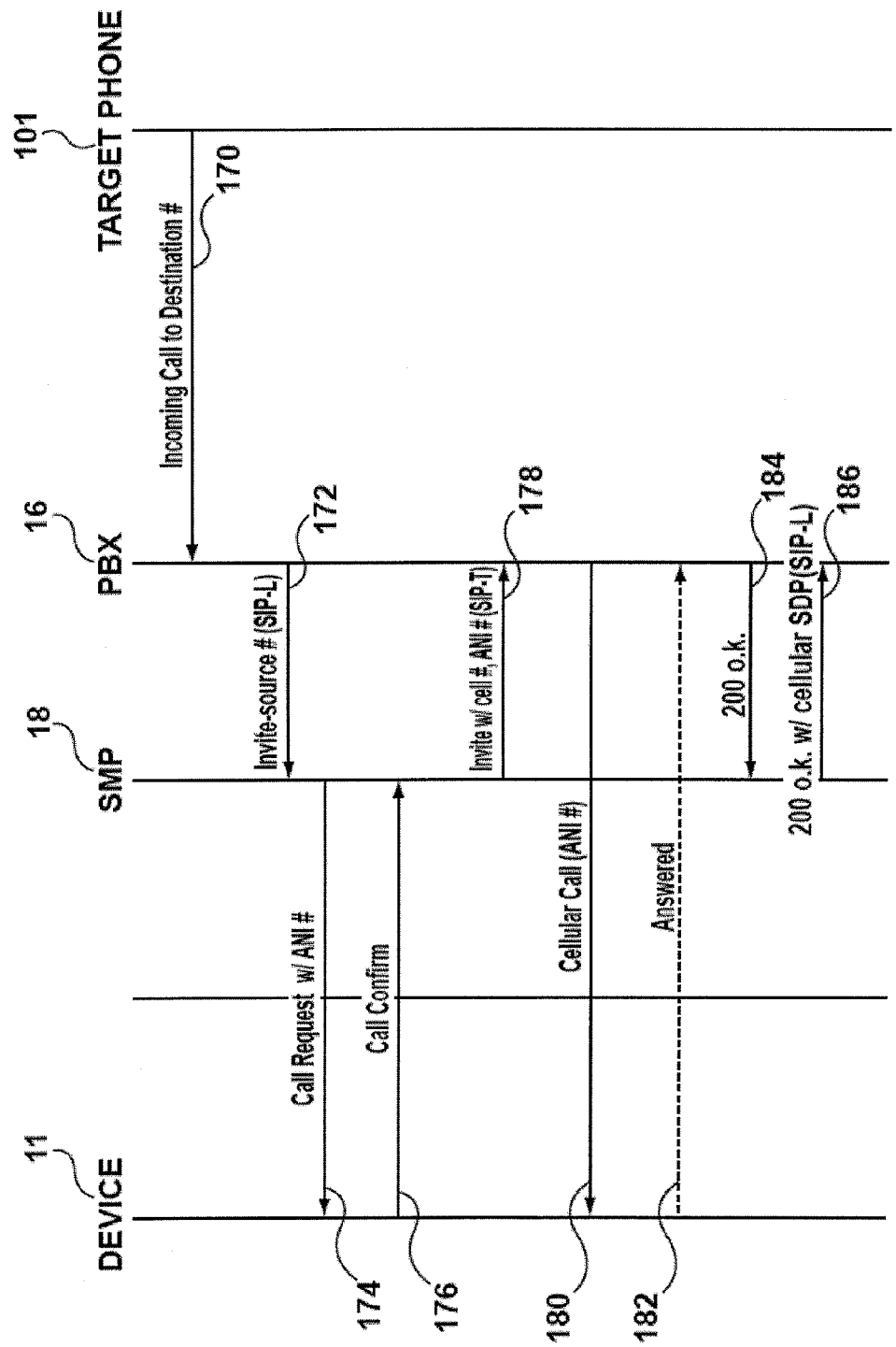
FIG. 7B is a signaling diagram generally indicating how mobile-terminated, PBX-initiated calls are processed by the network of FIG. 5.

FIGS. 7A and 7B are signaling diagrams illustrating a mobile terminated call utilizing SIP 80. Specifically, and for the purposes of this disclosure, the target phone 101 is originating the call, which will send a call to the mobile device. Turning first to FIG. 7A, an incoming call is made from the target phone 101 to the PBX 16 (block 150). When the call is received at the PBX 16, the PBX 16 sends an invite to the SMP 18 over SIP-L (block 152).

In response to the invite, the SMP 18 sends a call request with the DNIS number and source details to the device 11 (block 154), which is confirmed to the SMP (block 156). In addition to confirming the call, the mobile device 11 sends a cellular call to the DNIS number at the PBX 16 (block 158). Again, as the DNIS number is routed in the dialing plans to the SMP 18, upon receipt of the cellular call, the PBX 16 sends an invite over SIP-T to the SMP 18 with the DNIS number (block 160). In response to the invite, a "200 OK" signal is sent over SIP-T from the SMP 18 to the PBX 16, acknowledging that the call leg to the mobile device 11 is established (block 162). Finally, the initial invite (block 152) is acknowledged with the "200 OK" signal with the cellular SDP, at which point the call legs are joined and the target phone 101 and device 11 can communicate with each other on the call.

The diagram shown in FIG. 7A illustrates a "mobile-initiated" call, because, as discussed above with respect to FIGS. 6A and 6B, the SMP 18 presents the mobile device 11 with the DNIS number at the PBX 16 into which to call. However, it is also possible to employ a "PBX-initiated" mobile terminated call, as shown in FIG. 7B, where the PBX 16 sends an incoming call to the device 11 with the ANI number of the target phone 101.

Specifically, similar to the mobile initiated call described above and shown in FIG. 7A, the target phone 101 sends an incoming call to the destination number of the device, which is received at the PBX 16 (block 170). Upon receipt of the call, the PBX 16 sends an invite over SIP-L to the SMP 18 (block 172) with the source number of the target phone 101. In response to the invite, the SMP 18 sends a call request with the source number to the device 11 (block 174), with the ANI number the device should expect in the incoming call, the call request being confirmed by the device (block 176). At this point in the PBX-initiated call, the SMP 18 sends an invite over SIP-T to the PBX 16 with the cellular number and ANI number to use (block 178), prompting the PBX 16 to make a cellular call to the device 11 with the ANI number (block 180), prompting the device to ring. The device 11 answers the call (block 182), and a "200 OK" signal is sent from the PBX 16 to the SMP 18, acknowledging that the cellular call leg to the device 11 is established (block 184). In response, a "200 OK" signal is also sent from the SMP 18 to the PBX 16, acknowledging that the call leg to the target phone 101 is also established (block 186). The SMP 18 shuffles the SDP to connect the call legs, the call legs are joined, and the target phone 101 and device 11 can communicate with each other on the call.

As discussed above with respect to FIGS. 6A and 6B, the SMP 18 remains in control of the signaling between the target phone 101 and the mobile device 11 in both the mobile-initiated and PBX-initiated calls. Again, the decision to proceed with a mobile-initiated call or a PBX-initiated call is based on policy and may be set by a system administrator. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

Figure 8:
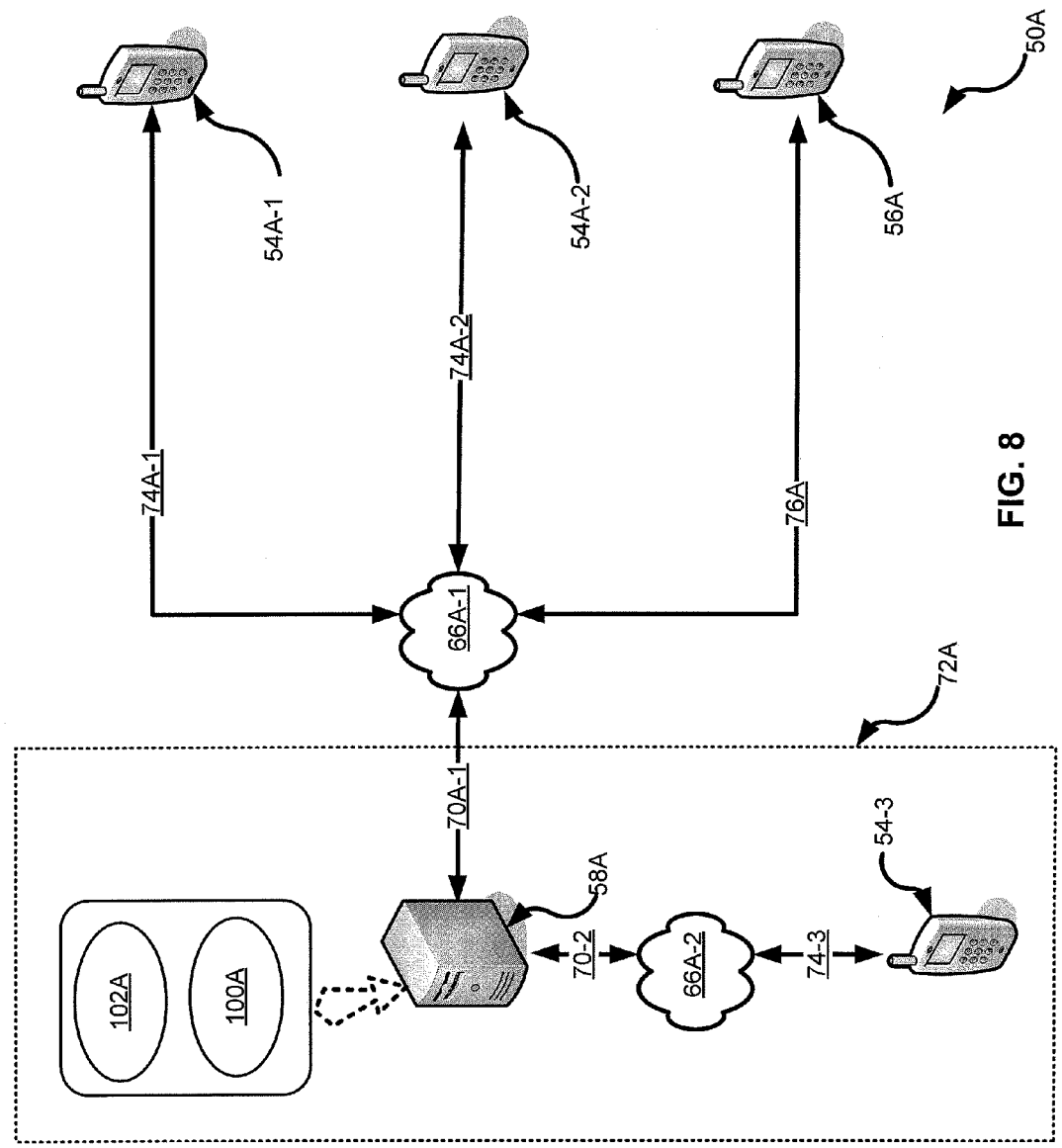
FIG. 8 is schematic representation of a system for call management.

The foregoing presents a specific framework on which the present teachings can be implemented. Referring now to FIG. 8, a system for call management is indicated generally at 50A. To assist in explanation of the teachings, system 50A is a simplified representation of system 10 and its variations, and as will be discussed further below various components in system 50A can be related to counterparts in system 10. In a present embodiment system 50A comprise a plurality of telephony devices 54A-1, 54A-2, 54A-3 (generically, telephony device 54A, collectively telephony devices 54A. This nomenclature is used elsewhere herein).

System 50A also comprises a call manager server 58A which is configured to maintain a policy 100A and execute a policy application 102A that utilizes policy 100A, all of which will be discussed in greater detail below. Devices 54A are all associated with call manager server 58A as will be discussed further below. System 50A also comprises another telephony device 56A which is not associated with call manager server 58A.

A public network 66A-1 connects telephony devices 54A-1 and 54A-2 to call manager server 58A, while a private network 66A-2 connects telephony device 54A-3 to call manager server 58A.

Public network 66A-1 can be any public network such as the Internet (or packet switched variations thereof) or the PSTN (or circuit switched variations thereof) or combinations thereof that is configured to carry voice communications between telephony devices 54A and call manager server 58A. Thus, a public backhaul link 70A-1 (which can be wired or wireless or combinations thereof, though is typically wired) connects call manager server 58A to public network 66A-1. In general it will now be understood that public network 66A-1 can be generally analogized to PSTN 40, WAN 30 or PLMN 50 or two or more of them from system 10.

Private network 66A-2 can be any private network such as an Intranet (or packet switched variations thereof) or a PBX (or circuit switched variations thereof) or combinations thereof that is configured to carry voice communications between telephony devices 54A and call manager server 58A. Thus, a private backhaul link 70A-2 (which can be wired or wireless or combinations of both, though is typically wired) connects call manager server 58A to private network 66A-2. Private network 66A-2 and call manager server 58A can thus be associated with an enterprise 72A or other entity. It will now be apparent that call manager server 58A can be part of, or otherwise associated with a PBX switch associated with enterprise 72A. Likewise it will now be apparent that private network 66A-2 can be analogized to the infrastructure described in relation to enterprise network 10 of system 10.

Telephony device 54A-1 connects to public network 66A-1 via a first link 74A-1, telephony device 54A-2 connects to public network 66A-1 via a second link 74A-2, and telephony device 54A-3 connects to private network 66A-2 via a third link 74A-3. The infrastructure that can be used to implement links 74A is not particularly limited and can also be wired or wireless or combinations thereof. Thus telephony devices 54A can be fixed, nomadic, or mobile. In a nomadic or mobile context, it is contemplated that device 54A-1 and device 54A-2 can establish connections call manager server 58A via private network 66A-2, and likewise that device 54A-3 can also establish connections with call manager server 58A via public network 66A-1. As a concrete non-limiting example of the mobile or nomadic context, links 74A-1 and 74A-2 in FIG. 8 can be implemented via a core mobile network such as a 3G network, or links 74A-1 and 74A-2 can be implemented via the Institute of Electrical and Electronics Engineers (IEEE) 802.11 or Bluetooth™ specification. In a fixed context or links 74A-1 and 74A-2 can be implemented by a plain old telephone system (POTS) line.

Devices 54A are associated with unique identifiers that are stored within policy database 100A maintained on call manager server 58A. Such unique identifiers may be absolute or relative identifiers or both. An absolute unique identifier is uniquely associated with the specific device 54A itself, whereas a relative unique identifier is uniquely associated with a subscriber that is presently associated with a particular device 54A. Examples of absolute unique identifiers include Media Access Control (MAC) addresses, POTS telephone numbers, and Mobile Subscriber ISDN Number (MSIDSN). Examples of relative unique identifier include a International Mobile Subscriber Identity (IMSI), and email addresses. A relative unique identifier would typically be maintained in conjunction with a corresponding absolute unique identifier.

Telephony device 56A is an example of one a plurality of additional telephony devices that are connected to public network 66A-1 via a link 76A, and which are not associated with call manager server 58A and therefore no record of which is maintained in policy database 100A. Device 56A and link 76A can be of any type of configuration, and in general device 56A is configured to conduct voice communications over network 66A-1, with any of devices 54A or any other telephony device (not shown) that is connected to network 66A-1.

Figure 9:
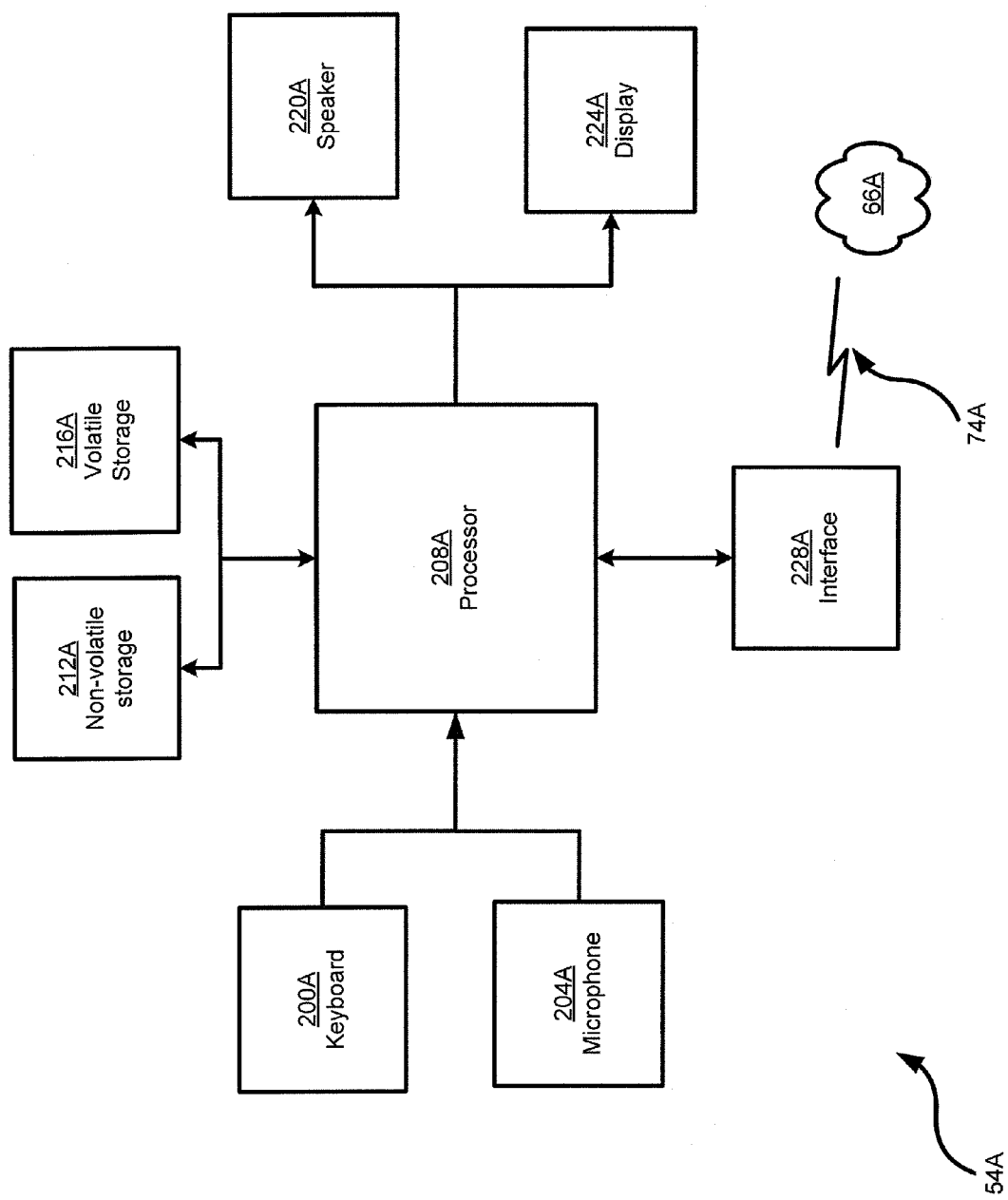
FIG. 9 is a schematic representation of a telephony device from FIG. 8.

Each telephony device 54A is typically any type of computing or electronic device that can be used to conduct voice communications network 66A. Referring now to FIG. 9, a schematic block diagram shows telephony device 54A in greater detail. It should be emphasized that the structure in FIG. 9 is purely exemplary, and contemplates an enhanced device that can be used for both wireless voice (e.g. telephony) and wireless data (e.g. email, web browsing, and text) communications. (The wireless data features are not required). Telephony device includes a plurality of input devices which in a present embodiment includes a keyboard 200A and a microphone 204A. Input from keyboard 200A and microphone 204A is received at at least one processor 208A, which in turn communicates with a non-volatile storage unit 212A (e.g. read only memory ("ROM"), Erasable Electronic Programmable Read Only Memory ("EEPROM"), Flash Memory) and a volatile storage unit 216A (e.g. random access memory ("RAM"). Device 54A also includes an interface 228A (e.g. a radio, or network interface card or the like) that connects processor 208A to the appropriate network 66A via link 74A. Various output devices are also provided, including a speaker 220A and a display 224A, which are connected to and controlled by processor 208A.

Programming instructions and databases that implement the functional teachings of telephony device 54A as described herein are typically maintained, persistently, in non-volatile storage unit 212A and used by processor 208A which makes appropriate utilization of volatile storage 216A during the execution of such programming instructions. Of particular note is that non-volatile storage unit 212A maintains a voice telephony calling application that can be used to initiate and receive telephony communications, which utilize microphone 204A and speaker 220A as controlled by processor 208A.

In general it will now be understood that telephony devices 54A and 56A are generally analogous to communication devices (i.e. mobile devices 11, phones 17 and computers 15) from system 10.

Figure 10:
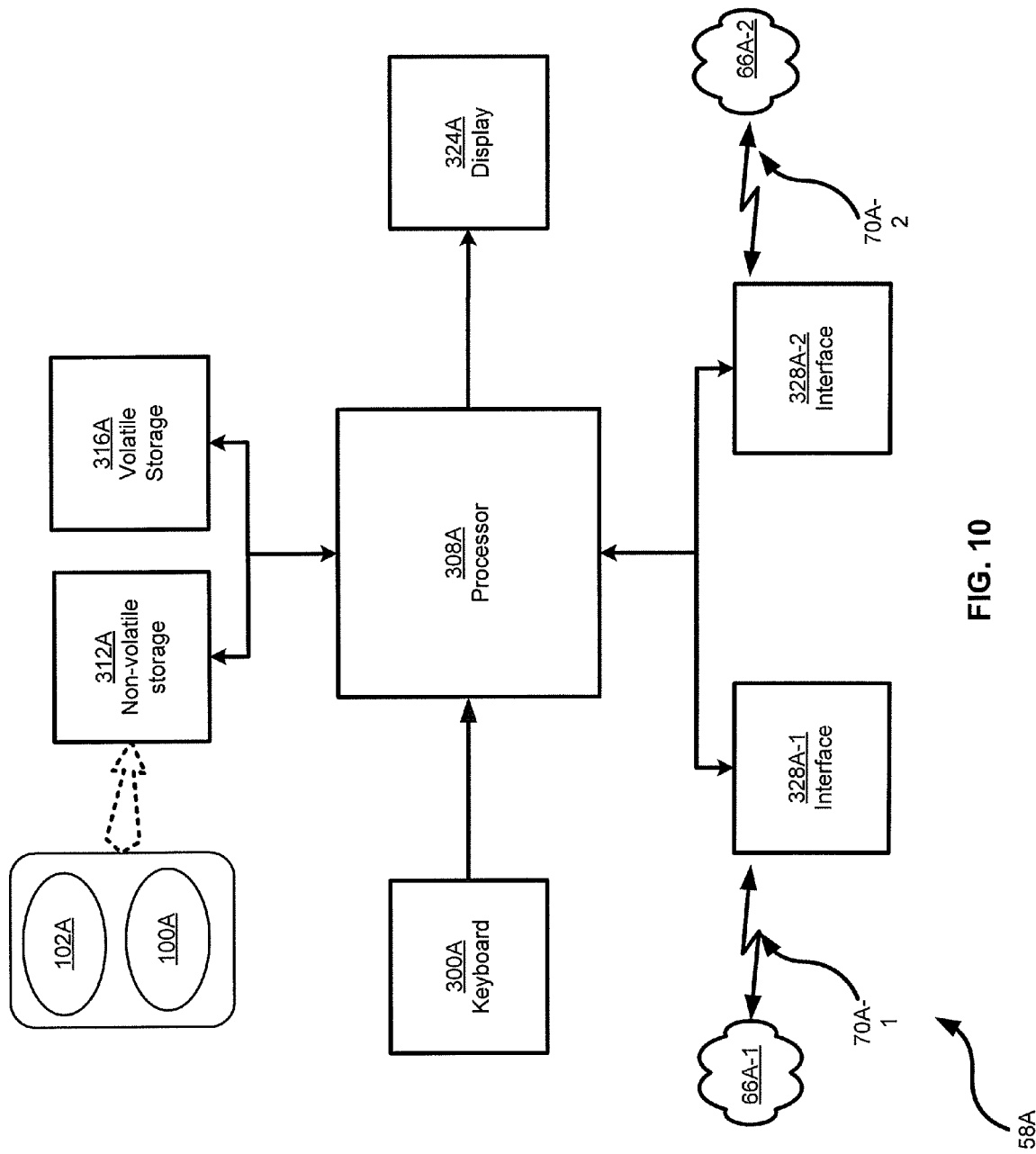
FIG. 10 is a schematic representation of a call manager server from FIG. 8.

Referring now to FIG. 10, a schematic block diagram shows call manager server 58 in greater detail. It should be emphasized that the structure in FIG. 10 is purely exemplary, and contemplates a server computing environment that can intermediate at least telephony communications. For example, server 58A can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for servers 58 and 62A are contemplated. Call manager server 58A includes an input device which in a present embodiment is a keyboard 300A. Input from keyboard 300A is received at at least one processor 308A, which in turn communicates with a non-volatile storage unit 312A (e.g. read only memory ("ROM"), Erasable Electronic Programmable Read Only Memory ("EEPROM"), Flash Memory) and a volatile storage unit 316A (e.g. random access memory ("RAM"). Call manager server 58 also includes a first interface 328-1 (e.g. a network interface card or the like) that connects processor 208 to network 66A-1 via link 70A-1. Call manager server 58A also includes a second interface 328A-2 (e.g. a network interface card or the like) that connects processor 308A to network 66A-2 via link 70A-2. An output device is also provided, including a display 324A, which is connected to and controlled by processor 208A. Note that keyboard 300A and display 324A are for configuration purposes, and can be configured for temporary connection to server 58A, or omitted where server 58A includes a remote management feature whereby server 58 can be controlled from a desktop computer or other client machine (not shown) that connects to one of the network interfaces 328A.

In general, it will now be understood that call manager server 58A can be implemented within enterprise communication system 14 (and its variants) from system 10.

Programming instructions that implement the functional teachings of call manager server 58A as described herein are typically maintained, persistently, in non-volatile storage unit 312A and used by processor 308A which makes appropriate utilization of volatile storage 316A during the execution of such programming instructions. Of particular note is that non-volatile storage unit 212A maintains both policy database 100A and policy application 102A.

Policy database 100A is configured to maintain data representing whether or not various unique identifiers associated with different devices 54A have permission to preempt ongoing communications with other devices 54A. Policy application 102A is configured to enforce the policy defined by policy database 100A. Table I shows an exemplary structure for policy database 100A.

TABLE I

Exemplary contents of policy database 100

| Entry | Device Identifier | Pre-emption permissions according to device identifier |
|---|---|---|
| 1 | 54A-1 | 54A-2; 54A-3 |
| 2 | 54A-2 | 54A-3 |
| 3 | 54A-3 | None |

TABLE I-continued

Exemplary contents of policy database 100

| Entry | Device Identifier | Pre-emption permissions according to device identifier |
|---|---|---|

Explaining Table I in greater detail, the Entry column of Table I is an index used to uniquely identify various records in database 100A. The Device Identifier column contains the unique identifier of the device 54A to which the policy record entry pertains. The unique identifier can be in terms of an absolute unique identifier or a relative unique identifier that points to an absolute unique identifier. In the simplified example in Table I, the contents of each Entry of the Device Identifier column include the reference character used to identify the relevant device 54A in the Figures. The Pre-emption Permissions column contains one or more unique identifiers, that correspond to one or more devices that can be pre-empted by the device 54A identified in the Entry with the corresponding Device Identifier. Again, in the simplified example in Table I, the contents of each Entry of the Pre-emption Permissions column includes the reference character used to identify one or more of the devices 54A in the Figures.

In the specific non-limiting example shown in Table I, the policy for device 54A-1 is that device 54A-1 is permitted to pre-empt calls that are in progress by devices 54A-2 and 54A-3; the policy for device 54A-2 is that device 54A-2 is permitted to pre-empt calls that are in progress by device 54A-3 but not for device 54A-1; and the policy for device 54A-3 is that device 54A-3 is not permitted to pre-empt calls that are in progress by another device 54A-1 or 54A-2.

Figure 11:
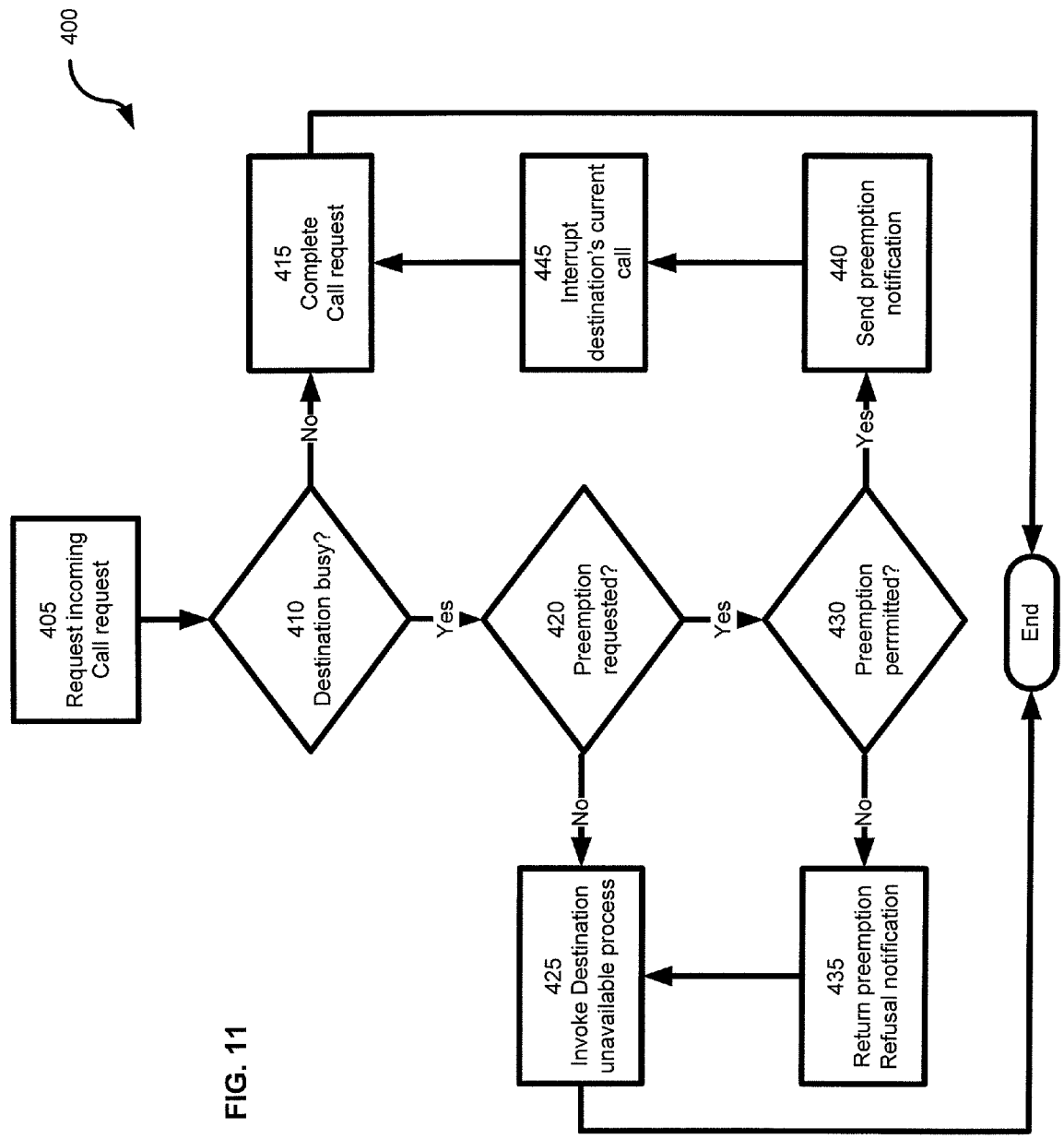
FIG. 11 shows a flowchart depicting a method for call management.

Referring now to FIG. 11, a method for call management is represented in the form of a flow-chart as indicated generally at 400. Method 400 can be performed using system 50A, though it is to be understood that method 400 can be performed on variations of system 50A, and likewise it is to be understood that method 400 can be varied.

Figure 12:
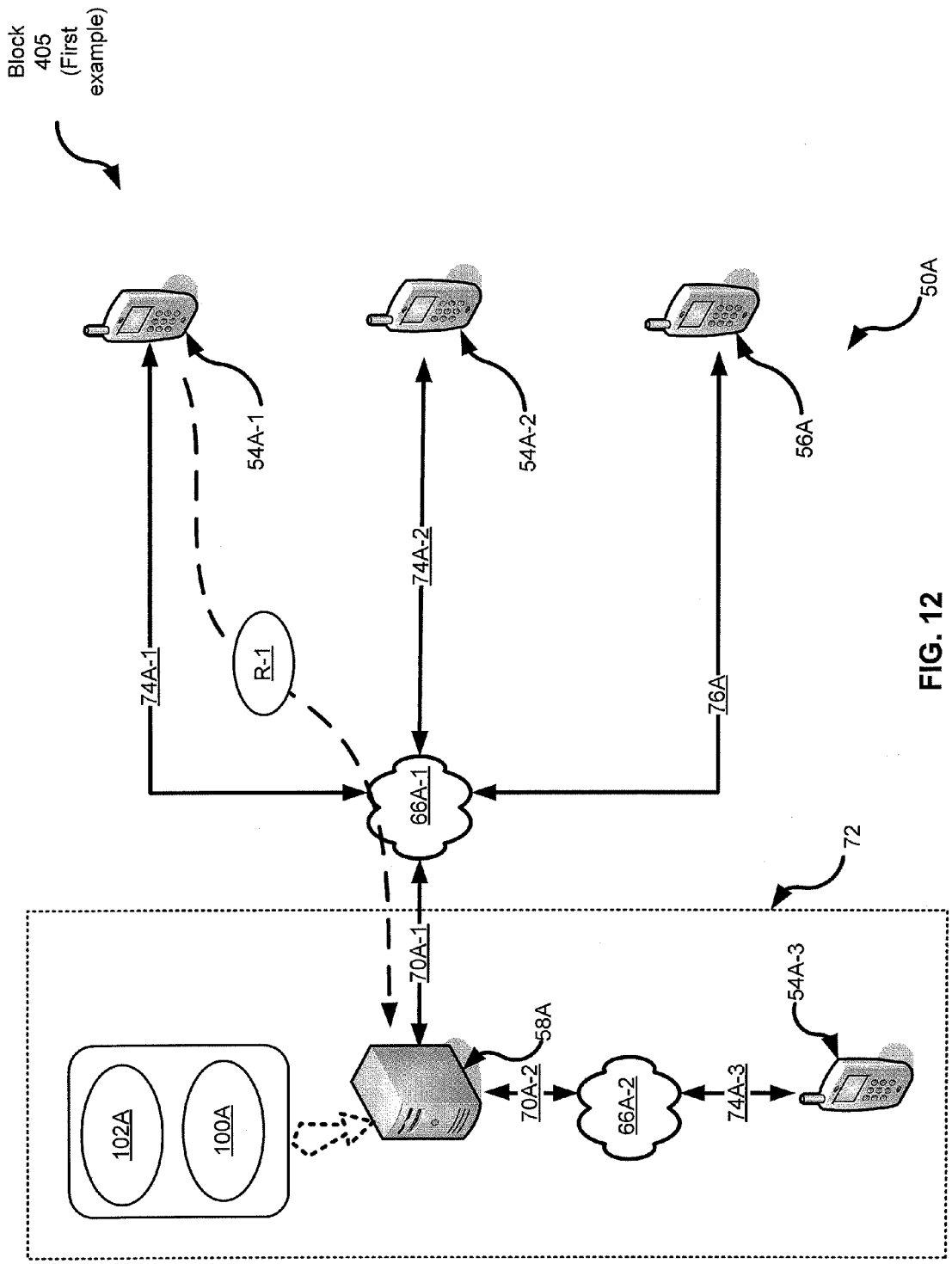
FIG. 12 shows the system of FIG. 8 during exemplary performance of part of the method of FIG. 11.

Block 405 comprises receiving an incoming call request. Block 405 is performed by call manager server 58A which receives a communication from one of devices 54A indicating that the device 54A is requesting to initiate a call with another device 54A. A specific example is shown in FIG. 12, where device 54A-1 initiates a request to initiate a call with device 54A-2. The request is represented as an oval bearing reference R-1 which is sent from device 54A-1 to call manager server 58A. Request R-1 can be formed in the usual manner, such as simply dialing a telephone number corresponding to device 54A-2 on device 54A-1. Of note is that even though device 54A-1 is connected to public network 66A-1 via link 74A-1, which include infrastructures that are already capable of routing a call from directly device 54A-1 to device 54A-2, request R-1 is nonetheless carried to call manager server 58 for completion, as in the present embodiment device 54A-1 is associated with the private network 66A-2 that is also administered by call manager server 58A, and thus device 54A-1 is configured to route such call requests via call manager server 58A.

Figure 13:
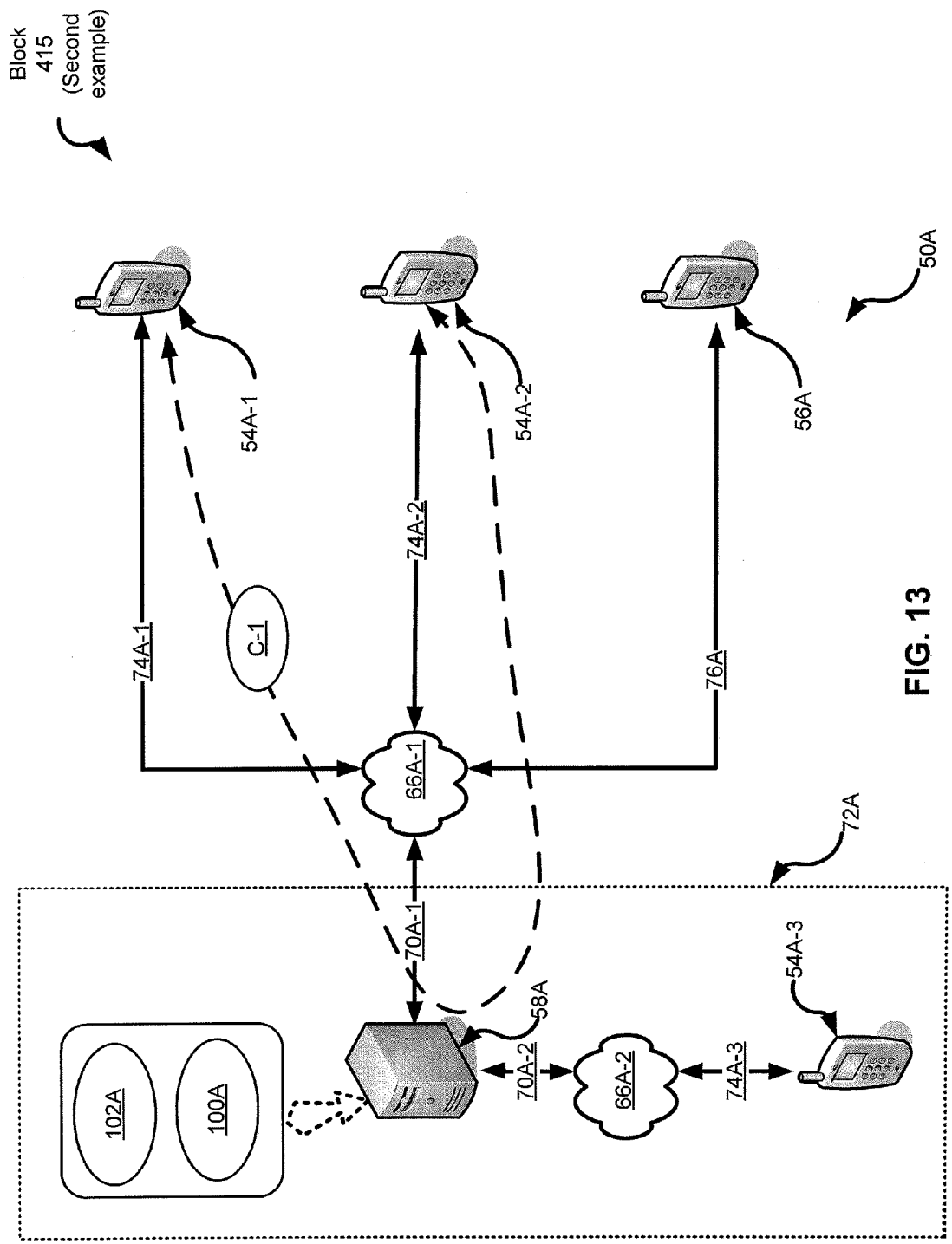
FIG. 13 shows the system of FIG. 8 during exemplary performance of part of the method of FIG. 11.

Block 410 comprises determining if the destination is busy. Block 410 is performed by call manager server 58A which examines the state of the destination identified in the request at block 405 to determine if that destination device is already in the middle of a call. If the determination at block 410 is "no", then at block 415 the call request from block 405 is fulfilled in the usual manner. Continuing with specific example shown in FIG. 11, a call completion is represented in FIG. 13 where a call C-1 is shown as established between device 54A-1 and device 54A-2. Call C-1 represented as an oval labeled as C-1 which is joins device 54A-1 and device 54A-2. At this point method 400 ends, but of course method 400 can perform differently than this first example.

Figure 14:
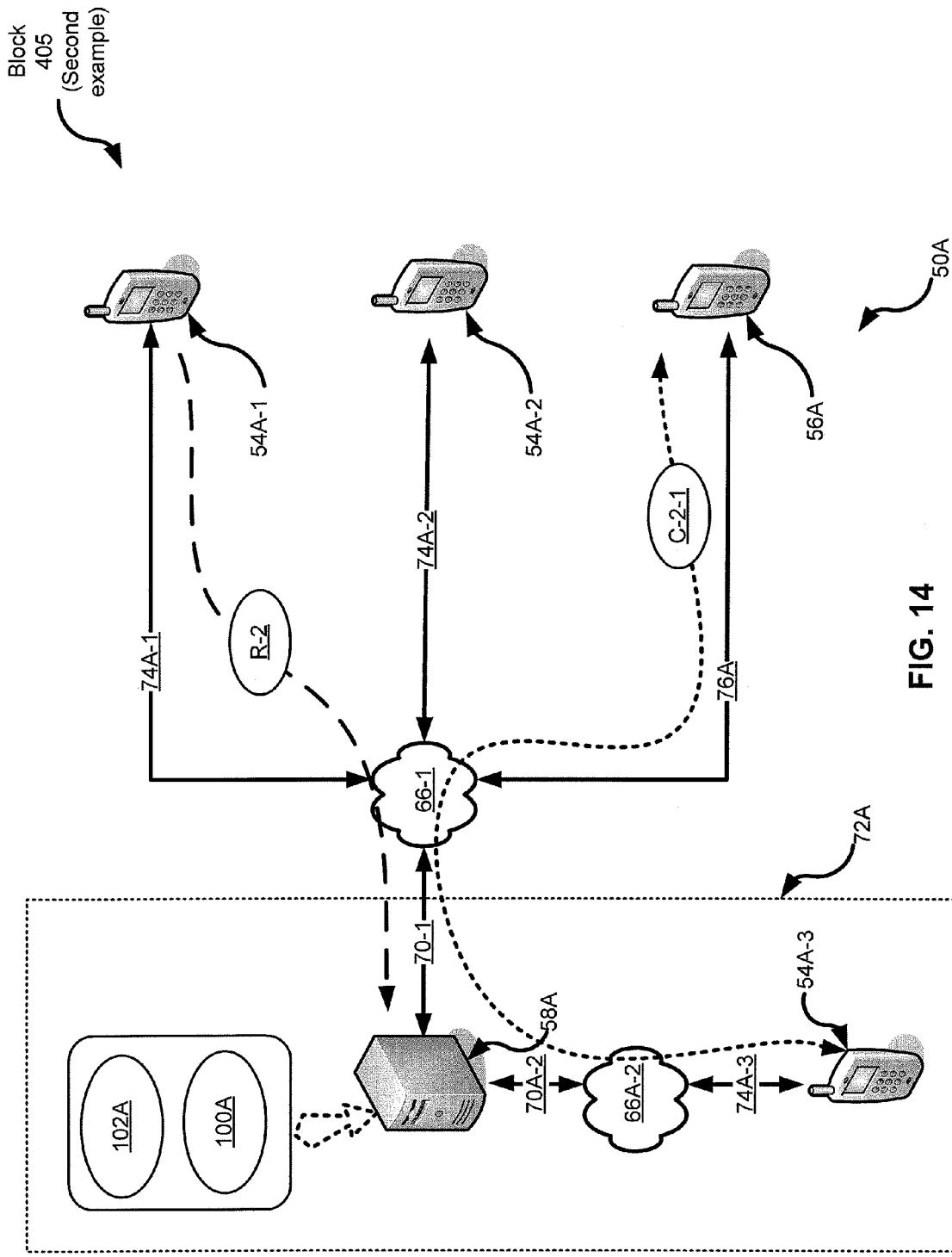
FIG. 14 shows the system of FIG. 8 during exemplary performance of part of the method of FIG. 4.

A second of exemplary performance of method 400 begins with assumptions expressed in FIG. 14, wherein a call C-2-1 is in progress between device 54A-3 and device 56A, at the same time that block 405 is invoked, wherein device 54A-1 sends an incoming call request R-2 to call manager server 58A, and incoming call request R-2 includes a request to complete a call between device 54A-1 and device 54A-3. Because of the state of system 50A in FIG. 14, when block 410 is reached a determination is made that "yes", the destination is busy. Block 420 thus comprises a determination as to whether preemption is requested. A preemption request is an indication from the device that originates the call at block 405 as to whether that device wishes to preempt an ongoing call at the requested destination telephone. A preemption request can be formed as part of request RA-2 itself, i.e. in the form of a flag set within the request that indicates that the call request itself accompanies a preemption request. A preemption request can also be in the form of a separate request initiated at the originating device, generated by dual tone multi-frequency (DTMF) input or via a more advanced input method such as a tick-box that is selected as part of a data screen that is generated on display 224. A preemption request can also be assumed to exist as part of an incoming call request at block 405. Such an assumption could be provided on a case-by-case basis by, for example, adding another column to Table I that indicates whether or not a preemption request is presumed.

A preemption request can also be in the form of a query sent back to the calling device 54, with a message that indicates "The called device is current on another call. Do you wish to preempt this call?". The preemption request can also be configured to be presumed after a predefined time, so that if the called device has already been a call for more than the predefined time, then the preemption request will be presumed to have occurred.

If no preemption is requested, then at block 420 a "no" determination is made and then at block 425 a process is invoked to manage the incoming call request according to a predefined process for managing incoming call requests when the destination is unavailable. Such a process at block 425 can include returning a busy signal to the calling device, forwarding the calling device to voicemail, or forwarding the calling device to an alternative device, or such other process as desired.

Figure 15:
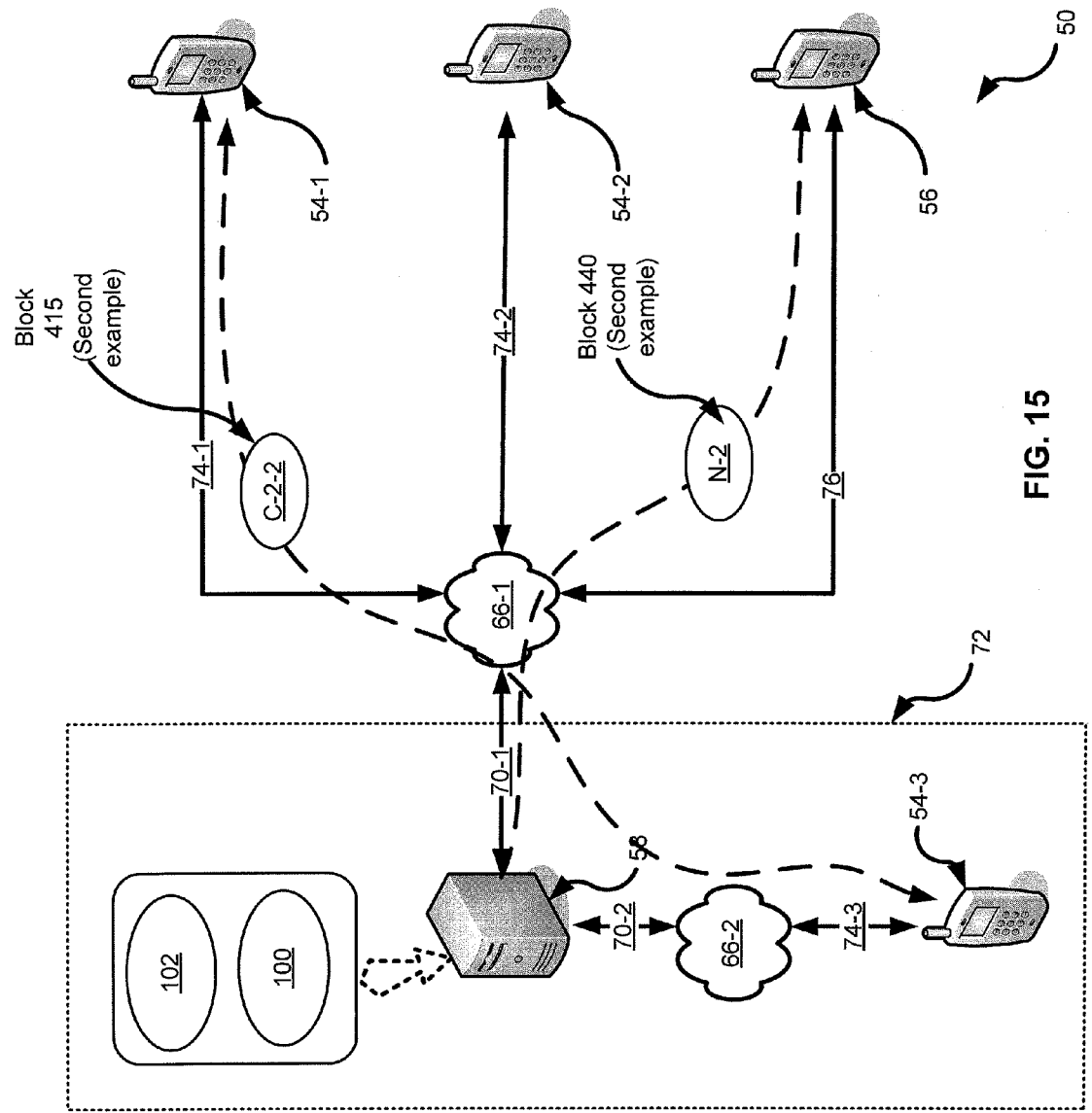
FIG. 15 shows the system of FIG. 8 during exemplary performance of part of the method of FIG. 1.

If preemption is requested, then at block 420 a "yes" is reached and then at block 430 determination is made as to whether the requested preemption is permitted. At least block 430 can be effected by policy application 102A utilizing policy database 100A. Using the example in Table I, at block 430 Entry 1 of Table I would be examined to arrive at a "yes" determination, that device 54A-1 is permitted to preempt calls in-progress associated with device 54A-3. Block 440 thus comprises sending a preemption notification to either or both devices which currently have a call in-progress. Block 440 is represented in FIG. 15 as a notification N-2 is sent to device 56A from call manager server 58A. While not shown in FIG. 15, notification N-2, or a variation thereof, can be sent to device 54A-3. The notification can take many forms, and in fact block 440 is optional. The notification can be a recorded audio message that states "Your current call has been terminated, please try making this call again later", or can be another message as desired. The notification message can be simple audible beep.

Block 445 comprises interrupting the destination number's current call. Block 445 is also represented in FIG. 15 by the fact that the call path for call C-2-1 is removed. From block 445 for this second example, method 200A moves to block 415 at which point the call request from block 405 is completed. Block 415 for this second example is represented in FIG. 15, as a second call C-2-2 is now shown in progress between device 54A-1 and device 54-3. At this point this second example of performance of method 200 ends.

As a third example of the performance of method 200, assume that device 54A-3 initiated a call at block 405 for either device 54A-1 or device 54A-2, and that device 54A-1 and device 54A-2 had a call in progress therebetween. Also assume that device 54A-3 submitted a preemption request so that a "yes" determination was made as block 420. In this third example, a "no" determination would be reached at block 430 since Table I indicates that device 54A-3 is never permitted to request preemption. In this third example, device 54A-3 would receive a notification from call manager server 58A that the preemption request was refused and method 400 would advance to block 425 which would be invoked as described above.

The foregoing presents certain exemplary embodiments, but variations or combinations or subsets thereof are contemplated. For example, policy database 100A can be proactively examined for a given device 54A so that the call flow in method 400 is dynamically adjusted based on the permissions for that given device. For example, in Table I device 54A-3 is indicated as never being permitted to request preemption, and therefore method 400 can be dynamically adjusted to a) never permit device 54A-3 to even request preemption or b) to presume a "no" determination at block 420 regardless of any preemption request from device 54A-3. Also note that the criteria in policy database 100A can be varied. For example, the policy defined in each entry of database 100A can be based on the priority of the call (e.g. emergency). For example, Table I could be varied to permit device 54A-3 to preempt a call if the device 54A-3 indicated a preemption request based on the fact that the call was an emergency. As another example, the policy can include overrides so that a particular device can indicate that it will always accept an preemption request, while other devices can indicated that they will never accept a preemption request, or will have their own criteria for accepting a preemption request. Where individual policies have a potential for conflict, then policy database 100 can also include conflict resolution rules.

Figure 16:
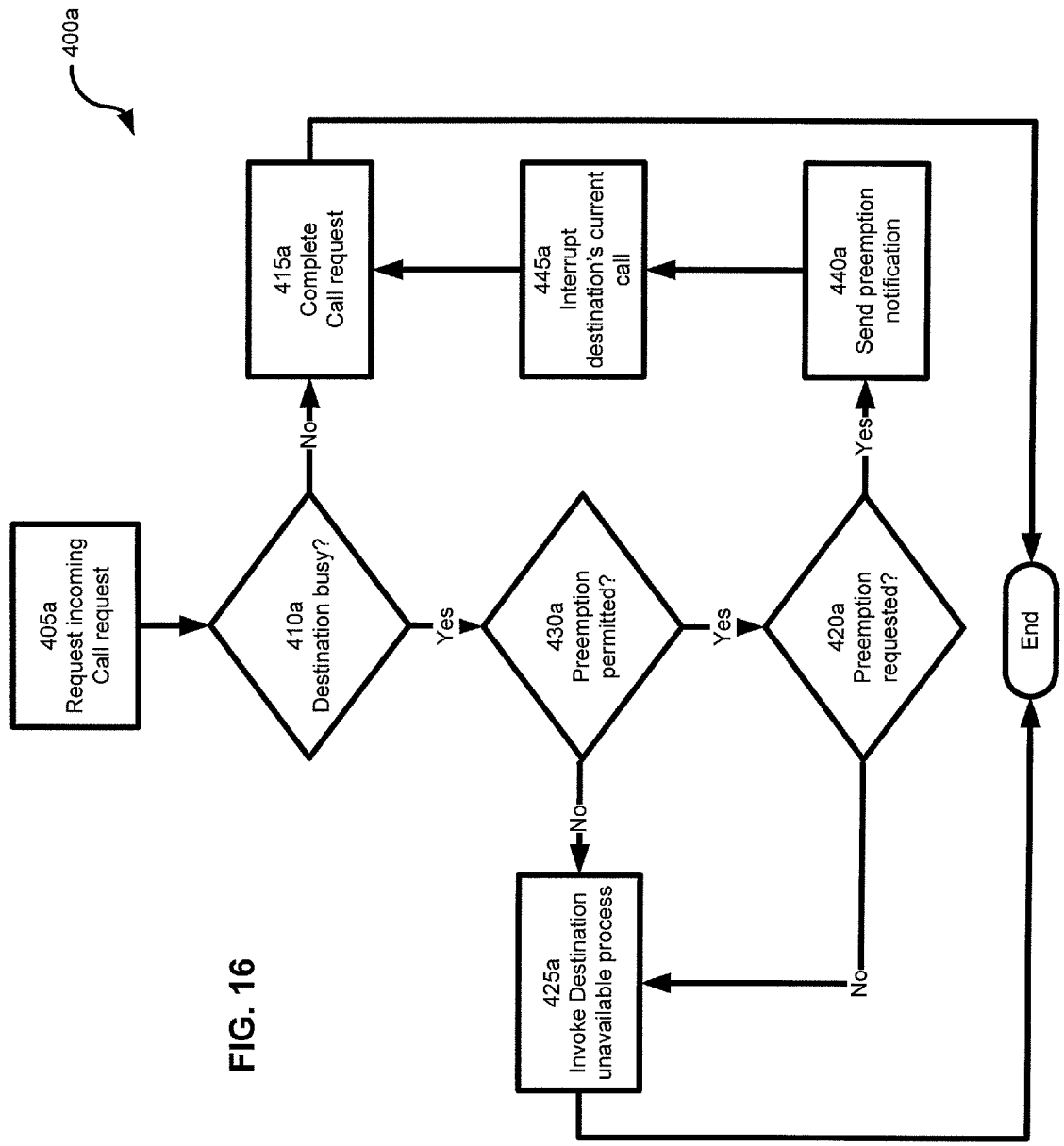
FIG. 16 shows a flowchart depicting another method for call management.

A still further variation is shown in FIG. 16, which shows a method for call management represented in the form of a flow-chart as indicated generally at 400a. Method 400a is an exemplary variation on method 400 and therefore like blocks bear like references except followed by the suffix "a". Of note is that in method 400a, block 430a is presented prior to block 420a (the opposite order of the corresponding blocks in method 400). In method 400a, at block 430a a determination is made as to whether preemption is permitted, and only if the determination at block 430a is "yes" is there a determination at block 420a as to whether preemption has even been requested.

The scope of the monopoly of this specification is defined by the claims attached hereto.

The invention claimed is:
1. A method of managing calls comprising:
receiving at a call manager server, an incoming call request to connect a first telephony device to a second telephony device, wherein said first telephony device and said second telephony device are associated with a private network;

if said second telephony device is otherwise engaged in another call with a third telephony device associated with a public network, determining at said call manager server if a preemption request exists to interrupt said another call;

if said preemption request exists, determining at said call manager server if a preemption policy permits said preemption request, wherein said preemption policy applies to said first telephony device and said second telephony device but does not apply to said third telephony device, wherein said preemption policy includes preemption permissions associated with a plurality of telephony devices including said first and second telephony devices, and said preemption policy permissions contain different determinations of whether preemption requests are permitted or not based on whether calls are emergency calls or not;

if said preemption policy permits said preemption request, terminating at said call manager server said another call, providing a notification to one or more of said second telephony device and said third telephony device as to termination of said another call, and completing said call request by connecting said first telephony device to said second telephony device; and, if said preemption policy does not permit said preemption request, invoking a process at said call manager server for managing incoming call requests when said second telephony device is unavailable;

if said second telephony device is not otherwise engaged in another call with said third telephony device, completing at said call manager server said call request by connecting said first telephony device to said second telephony device.

2. The method of claim 1 further comprising, if said preemption request does not exist, invoking said process for managing incoming call requests when said second telephony device is unavailable said call.

3. The method of claim 1 wherein said policy permits preemption requests from said first telephony device to said second telephony device, but does not permit preemption requests from said second telephony device to said first telephony device.

4. The method of claim 1 wherein said policy is based on the priority of said call request.

5. The method of claim 1 wherein said policy include overrides such that either said first telephony device or said second telephony device will always accept a preemption request, or that said first telephony device or said second telephony device will never accept a preemption request.

6. A call manager server comprising:
  storage for maintaining a policy application and a policy database, said policy database including a policy indicating permissions as to whether a first telephony device is permitted to interrupt an existing call between a second telephony device and a third telephony device, wherein said permissions contain different determinations of whether or not existing calls are permitted to be interrupted based on whether existing calls are emergency calls or not;
  a processor connected to said storage and configured to executed said policy application;
  a network interface connected to said processor and configured to connect to said telephony devices;
  said processor configured to receive a call request from said first telephony device to connect to said second telephony device; said processor configured through said policy application to interrupt any existing call between said second telephony device and said third telephony device if said policy data indicates a permission that such interruption is permitted, said processor configured to provide a notification to one or more of said second telephony device and said third telephony device as to interruption of said any existing call,
  wherein said call manager server is associated with a private network and said first telephony device and said second telephony device are associated with said private network and said third telephony device is associated with a public network, and
  wherein said policy applies to said first telephony device and said second telephony device but does not apply to said third telephony device.

7. The call manager server of claim 6 wherein said call manager server connects to said public network and said first telephony device and said second telephony device are configured to connect to said call manager server via said private network or said public network.

8. The call manager server of claim 7 wherein said policy includes preemption permissions associated with a plurality of additional telephony devices associated with said private network.

9. The call manager server of claim 6 wherein said policy permits preemption requests from said first telephony device to said second telephony device, but does not permit preemption requests from said second telephony device to said first telephony device.

10. The call manager server of claim 6 wherein said policy is based on the priority of said call request.

11. The call manager server of claim 6 wherein said policy include overrides such that either said first telephony device or said second telephony device will always accept a preemption request, or that said first telephony device or said second telephony device will never accept a preemption request.

12. The call manager server of claim 6 wherein said first telephony device and said second telephony device are permitted to interrupt an existing call with each other.

* * * * *